Feb. 1, 1949. W. G. MILLER 2,460,647
FLOW CONTROL DEVICE
Filed April 5, 1947
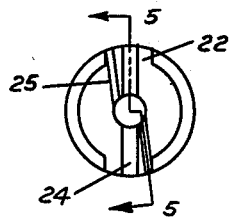
FIG. 6
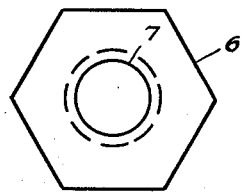
FIG. 2
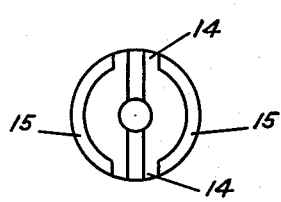
FIG. 3
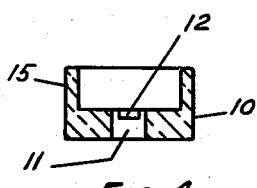
FIG. 4
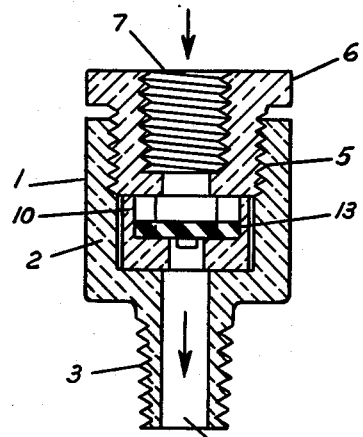
FIG. 1
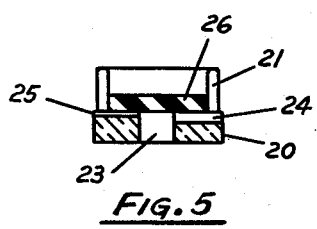
FIG. 5
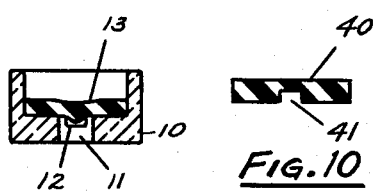
FIG. 7   FIG. 10
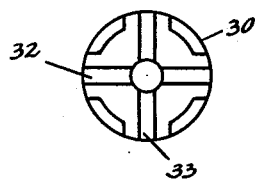
FIG. 8   FIG. 9
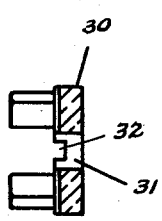
INVENTOR.
Wesley G. Miller
BY
Florian S. Miller
Atty.

Patented Feb. 1, 1949

2,460,647

UNITED STATES PATENT OFFICE 2,460,647

FLOW CONTROL DEVICE

Wesley G. Miller, Erie, Pa., assignor to Hays Manufacturing Company, Erie, Pa., a corporation of Pennsylvania Application April 5, 1947, Serial No. 739,551

10 Claims. (Cl. 138—45)

This invention relates generally to flow control devices for controlling the flow of fluid through a pipe line which varies in pressure and temperature.

No practical device has heretofore been provided which will control the flow of fluid which varies greatly in pressure through a pipe line so that a substantially constant flow of the fluid eminates from the outlet end of the pipe line. Resilient cylindrical shaped members having an aperture extending axially thereof have been provided in pipe lines wherein the pressure on the resilient member restricted the inner aperture but it has been found that with a substantial increase in pressure, control of the fluid passing through the resilient member to the outlet of the pipe line is negligible in that the central aperture of the flow control member is directly in axial alignment with the inlet and the outlet of the flow control member. Where the central portion of the flow control member flexes downwardly into a larger aperture, the control is likewise negligible at higher pressures because the resilient member quickly reaches its maximum restricted position, and it is then forced outwardly by the pressure of the fluid. It is further found that these prior resilient members became fatigued very quickly and lost their efficiency after a short period of time and frequently replacement is therefore required to obtain any degree of control whatsoever. No practical means has heretofore been provided to control the flow of fluid over a wide range of pressures such as from 15 pounds per square inch to two hundred pounds per square inch. Centrally apertured resilient members cannot be practically used for flow control where temperatures vary an appreciable amount in that the central aperture varies in size on change in temperature.

It is, accordingly, an object of my invention to overcome the above and other defects in flow control devices and it is more particularly an object of my invention to provide a flow control device which is simple in construction, economical in cost, efficient in operation, and economical in manufacture.

Another object of my invention is to provide a flow control device in a fluid line which controls the quantity of fluid passing therethrough regardless of the variations in temperature and pressures of the fluid.

Another object of my invention is to provide a fluid control device in a fluid line which permits maximum flow of fluid through the fluid line while controlling the quantity of fluid passing from the fluid line.

Other objects of my invention will become evident from the following detailed description, taken in conjunction with the accompanying drawings, in which Fig. 1 is a vertical sectional view of a flow control device illustrating a preferred embodiment of my invention;

Fig. 2 is a plan view of the flow control device shown in Fig. 1;

Fig. 3 is a top plan view of the flow control insert member shown in Fig. 1;

Fig. 4 is a vertical sectional view of the insert member shown in Fig. 3;

Fig. 5 is a view taken on the line 5—5 of Fig. 6;

Fig. 6 is a top plan view of a modified form of insert member for my novel fluid flow control device;

Fig. 7 is a vertical sectional view of the insert member shown in Figs. 3 and 4 with the control member in a position to restrict the flow of fluid;

Fig. 8 is a plan view of another modified form of insert member;

Fig. 9 is a vertical sectional view of the insert member shown in Fig. 8; and

Fig. 10 is a vertical sectional view of a modified form of flow control member.

Referring now to the drawings, Figs. 1, 2, 3, and 4 show a flow control member 1 for disposal in a pipe line comprising a cylindrically shaped body portion 2, and externally threaded extension 3 having an outlet aperture 4, and internally threaded portion 5 for threadably engaging a threaded cap member 6 having a threaded aperture 7 providing an inlet for the flow of fluid in the flow control member 1. An open cup-shaped insert member 10 having a central aperture 11 for alignment with the outlet 4 in flow control member 1 and radially extending grooves 12 extending outwardly from the aperture 11, is disposed in the flow control member 1 as shown in Fig. 1. A flat, cylindrical shaped resilient member 13 is disposed over the aperture 11 and grooves 12 in the insert member 1 to control the flow of fluid passing from the inlet 7 to the outlet 4 of the flow control member 1. The insert member 10 has the upper wall portions 15 thereof cutaway at 14 to permit lateral flow of fluid from the inlet 7 to pass around the outer side of the resilient member 13 through the grooves 12 and into the aperture 11 to the outlet 4. The aperture 11 is preferably made of a sufficiently greater cross-sectional area than the cross-sectional area of the grooves 12 to permit free flow of fluid there-through. The resilient member 13 is preferably made of a flexible resilient material such as rubber, although any suitable resilient material may be used.

In operation, the flow control member 1 is threadably engaged with suitable piping with the inlet pipe attached to the threaded aperture 7 and the outlet pipe threadably attached to the threaded extension 3. A fluid passes downwardly through the inlet aperture 7 against the upper side of the resilient member 13 wherein it passes laterally outwardly around the member 13 and through the grooves 12 to the aperture 11 in the insert member 10 and to the outlet aperture 4 of the flow control member 1. When the pressure of the fluid is rather low, such as when the pressure is under fifty pounds per square inch, there will be little deflection of the resilient member 13 thereby causing little restriction of the flow of fluid through the grooves 12. As the pressure increases, a portion of the resilient member 13 is forced downwardly into the grooves 12 as shown in Fig. 7 to restrict the cross-sectional area of the grooves 12 and provide a barrier to the flow of fluid therethrough. It has been found that the flow of fluid through a fluid line can be controlled by my novel flow control device so that the quantity of fluid passing therefrom does not vary upon passage of a comparatively large volume of fluid even though the variations in the pressure of the fluid may be from fifteen pounds per square inch to two hundred pounds per square inch. It has further been found that because of the small portion of the resilient member 13 being forced into the grooves 12, and because normally there is some rotational movement of the resilient member 13, there is a little change in the elasticity of the resilient member 13 even after it has been in operation for a considerable period of time. Furthermore, because of the fact that the resilient member 13 seats over the grooves 12, contraction and expansion thereof due to changes in temperature of the fluid will not cause any decrease in efficiency in that the diameter of the resilient member has no effect upon its ability to restrict the grooves 12 to the flow of fluid. This is not so in a flow control member having a central aperture in that the central aperture increase and decreases in size due to changes in temperature of the fluid.

In Figs. 5 and 6, I have shown a modified form of my invention wherein a cup-shaped insert member 20 having upwardly extending wall portions 21 and cutaway portions 22, has an aperture 23 with comparatively deep radially extending grooves 24 extending outwardly from the aperture 23 and a second pair of comparatively shallow grooves 25 adjacent and contiguous to the grooves 24 extending outwardly from the aperture 23 in the member 20. A resilient member 26 is disposed over the aperture 23 and portions of which move into the grooves 24 and 25 upon an increase in the pressure of the fluid to restrict the cross-sectional area of the grooves 24 and 25 and thereby control the quantity of fluid passing outwardly through the aperture 23 of the insert 20. This type of flow control with double grooves is utilized where larger cross-sectional areas of the passages are desired for greater flow of fluid and better control is desired at the lower pressures in that the resilient member 26 will quickly move into the shallow grooves 25 to completely cut off the flow of fluid therethrough after a predetermined increase of pressure in the fluid line in the low pressure ranges. It will be evident, therefore, that a greater area is provided for the passage of fluid under normal conditions and better control of the flow of the fluid is provided at comparatively low pressures. Although I have shown a deep and a shallow groove adjacent to each other, a second shallow groove may be provided on the opposite side of the deep groove without departing from my invention.

In Figs. 8 and 9, I have shown an insert member 30 with aperture 31 similar to the insert member 20 in Fig. 5 except that the deep grooves 32 and shallow grooves 33 are normal to each other. The operation is the same as that previously described for the members shown in Figs. 5 and 6.

The flow control element 1 in Fig. 1 is shown with an insert 10 disposed therein, but it will be evident that a radially extending groove may be provided extending outwardly of the outlet aperture 4 to provide a control for the flow of fluid without the use of the insert 10.

A resilient member 40 having a groove 41 shown in Fig. 10 for disposal against a flat apertured surface may also be utilized to control the flow of fluid by restriction of the groove 41.

From the foregoing it will be seen that I have provided a novel flow control device which controls the quantity of fluid passing from a pipe line regardless of the changes of temperature and pressure of the fluid passing through the pipe line within practical limits and I have further provided a flow control device with no moving parts and with a minimum of wearing parts.

Various changes may be made in the specific embodiment of my invention without departing from the spirit thereof, or from the scope of the appended claims.

What I claim is:

1. A flow control device for varying pressure fluids comprising a member having an inlet and an outlet aperture, said outlet aperture having a shoulder adjacent thereto with a grooved passage extending outwardly therefrom, and a resilient member disposed over said outlet aperture and said grooved passage in the path of fluid passing through said member for controlling the quantity of fluid passing therethrough.

2. A flow control device as set forth in claim 1 where said outlet aperture is greater in cross-sectional area than the cross-sectional area of said grooved passage.

3. A flow control device for varying pressure fluids comprising a member having an inlet and an outlet aperture, an insert member disposed over said outlet aperture having a central aperture for alignment with said outlet aperture and a groove passage extending radially outwardly therefrom, a resilient member for disposal over the said aperture in said insert member and said grooved passage therein for controlling the quantity of fluid passing through said member.

4. A flow control device as set forth in claim 3 wherein said insert member comprises a cup-shaped member having the wall portions thereof cut away adjacent the outer end of said groove.

5. A flow control device as set forth in claim 3 wherein said grooved passage has contiguous grooved passages shallower than said main grooved passage in the bottom of said insert member.

6. A flow control device for varying pressure fluids comprising a member having an inlet and an outlet end, said outlet end having a centrally disposed aperture and radially outwardly extending grooved passages, and a resilient member for disposal over said outlet aperture and said grooved passages having a portion thereof adapted to move into said grooved passages upon increase in the pressure of the fluid passing through said member to restrict said passages to the flow of fluid.

7. A flow control device for varying pressure fluids as set form in claim 6 wherein grooves of varying depths are disposed in the outlet end of said member and covered by said resilient member.

8. A flow control device for varying pressure fluids comprising a member having an inlet and an outlet aperture, an insert member disposed over said outlet aperture having a central aperture for alignment with said outlet aperture and a grooved passage extending radially outwardly therefrom, said insert member being cup-shaped in form and having the terminal portions of said grooves cut away to permit free passage of fluid, and a resilient member for disposal over said aperture in said insert and said grooved passage therein having a portion thereof adapted to move into said grooved passage upon increase of the pressure in said member to restrict the cross-sectional area of said passage to the flow of fluid.

9. A flow control device for varying pressure fluids as set forth in claim 8 wherein grooved passages extend outwardly from the aperture in said insert member, one of said passages being comparatively deeper than the other passages.

10. A flow control device comprising a member having an outlet aperture and laterally extending grooved passages leading thereto, and a resilient member for disposal over said aperture and said grooved passages adapted to restrict the cross-sectional area of said passages upon increase in pressure of the fluids.

WESLEY G. MILLER.

REFERENCES CITED

The following references are of record in the file of this patent:

UNITED STATES PATENTS

| Number | Name | Date |
| --- | --- | --- |
| 1,923,408 | Zerk | Aug. 22, 1933 |

FOREIGN PATENTS

| Number | Country | Date |
| --- | --- | --- |
| 372,286 | Great Britain | 1932 |